Feb. 11, 1936.  E. S. TAYLOR  2,030,277
TORQUE MOTOR
Filed April 8, 1935
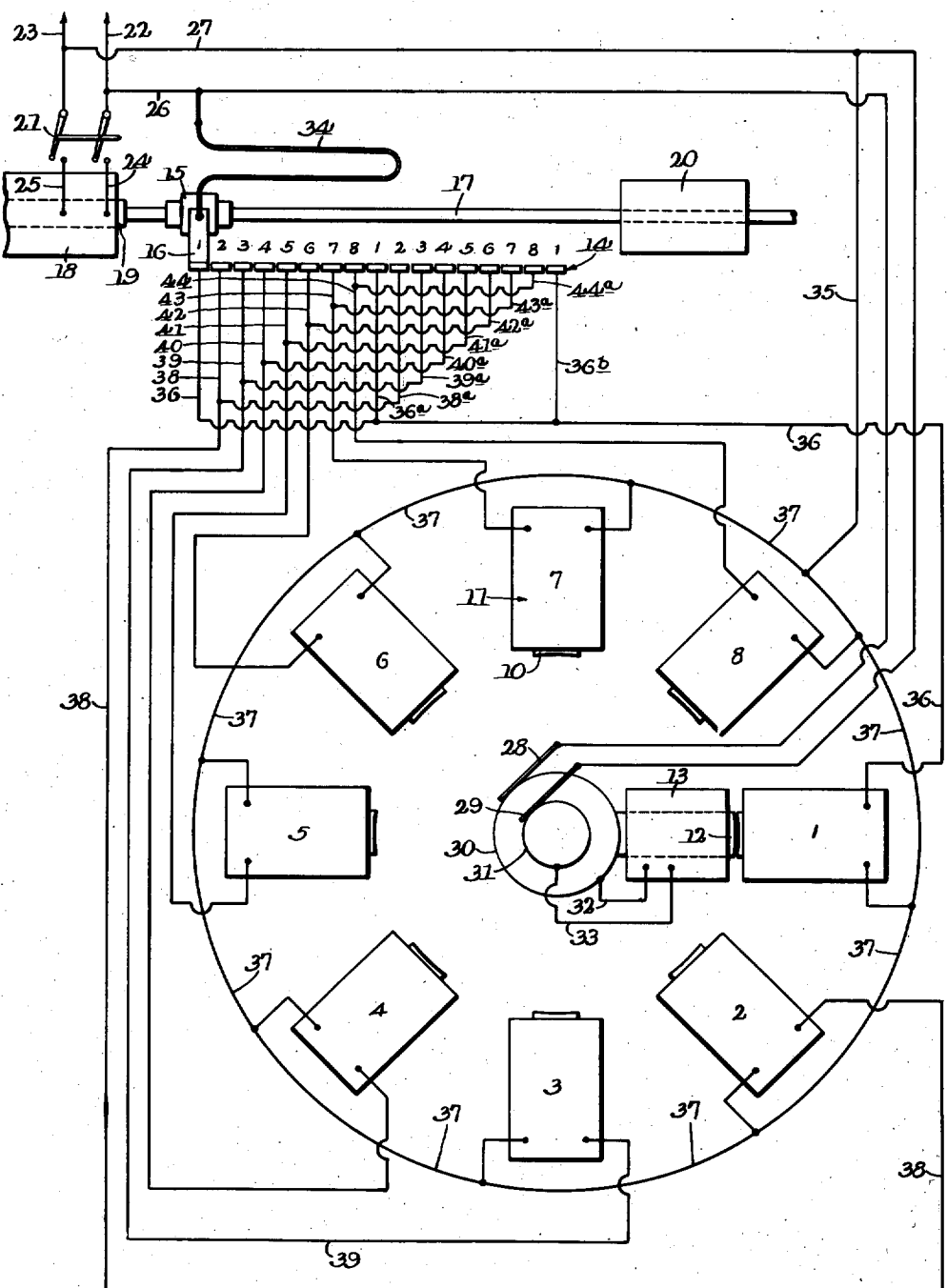
Inventor:
Eugene S. Taylor
BY Parkinson & Lane, Atty.

Patented Feb. 11, 1936

2,030,277

UNITED STATES PATENT OFFICE 2,030,277

TORQUE MOTOR

Eugene S. Taylor, Chicago, Ill.

Application April 8, 1935, Serial No. 15,148

4 Claims. (Cl. 172—239)

The present invention relates to electrical devices for moving loads, or for doing work, such as operating automobile parking devices, door operating devices, etc., and more particularly to a torque motor for moving loads.

Among the objects of the invention is to provide a novel load moving means, such as a torque motor comprising a stator, a load mover or rotor, and circuit control means for controllably energizing the same.

In the embodiment selected to illustrate the invention the stator comprises a series of poles and coils or solenoids so wound that all the stator poles will have the same polarity throughout the series. The rotor has an armature having but one pole and a coil or solenoid so wound that its polarity will be opposite to that of the stator poles. The circuit control means comprises a series of circuit closing contacts or elements arranged in correspondence with the poles and coils of the stator and are so connected as to successively energize the stator poles and coils in either direction of the series thereof, and a circuit closing means, such as a sliding member, for successively contacting the circuit closing contacts so as to close the circuits successively as stated above. The sliding member is such that it will contact a succeeding and the preceding contact of the series so as to close a succeeding circuit to energize a succeeding stator coil of the series before it will open the preceding circuit to de-energize the preceding stator coils of the series. In that way a smooth, even and regular movement of the rotor armature with a high torque at low speed will be affected by the successive and serial energizing of the stator coils.

Another object of the invention is to provide a novel device of the character mentioned and one in which the armature may move or rotate indefinitely in accordance with the extent of the series of circuit closing contacts used. As for example, in the illustrative embodiment chosen to illustrate the invention, there are two sets or series of contacts each corresponding with the coil series of the stators, so that as the circuit closer moves over the two sets of contacts, the rotor moves through two entire revolutions. With three or more sets or series of contacts it will be apparent the armature or rotor will accordingly rotate through three or more entire revolutions. The rotation of the rotor is in either direction depending on the direction of energizing the stator coils and of closing the corresponding series of circuits from the circuit closing contacts.

A further object of the invention is to provide a novel torque motor which will act as a torque brake. When a stator pole is energized or two adjacent poles are energized to stress the armature pole, as to hold it opposite said stator pole or between said adjacent poles, any tendency of the load to cause the armature to move will be counter-acted by the stress of the energized stator pole or poles acting on the armature. Thus the stress of the energized stator pole or poles acts or act to hold the armature still and hence the load, and also to prevent over-run of the load when the rotor has moved it to the limit of movement by a counter torque or braking effect on the rotor.

Another object of the invention is to provide a novel torque motor which is capable of operating in either direction without any reversal of electrical current in either the stator or rotor coils, but by merely reversing the order of closing the circuits for the successive energizing of the stator coils. In other words, the stator coils are successively energized in either one or the other direction of the series of the stator coils but the passage of the current through the coils when energized is always the same. The rotor coil is constantly energized.

A further object of the invention is to provide a novel control device for the circuits of the torque motor of the present invention, the circuit control means being independently operated at any predetermined or given rate of successive closing or opening of the circuits which in turn controls the rate of moving the load by the torque movement.

Other objects, capabilities, advantages, features, and the like are comprehended by the invention as will later appear and as are inherently possessed thereby.

Referring to the drawing, the figure is a diagrammatic view of an embodiment chosen to illustrate the invention, and the wiring circuits therefor.

Referring more in detail to the drawing, the embodiment selected to illustrate the invention is shown as comprising a stator having a series of poles 10 provided with coils or solenoids 11 so wound that when energized all the poles will be always of like or the same polarity, as for example the coils may be wound so that the inner ends of the poles will be of "North" polarity and their outer ends of "South" polarity when using direct current, and conversely.

The load to be moved is operated by any suitable power transmitting means (not shown) preferably having a shaft to which is secured a rotor armature pole 12 having a coil or solenoid 13 so wound that the outer end of the pole 12 will be of opposite polarity to that of the inner ends of the poles 10.

Alternating current also may be used, in which case the coils are so wound that the current in the armature coil 13 will be such that the polarity of the armature pole will always be opposite to that of the stator poles as the polarities change in accordance with the cycles of the current used.

The stator poles are arranged in a circular series, and are numbered 1, 2, 3, 4, 5, 6, 7 and 8, No. 1 becoming the end of the series for a complete revolution. Corresponding with these are series of circuit closing contacts 14 there being in the illustrative embodiment two of these series the contacts of each of which are numbered 1, 2, 3, 4, 5, 6, 7 and 8, in correspondence with the poles 1, 2, 3, 4, 5, 6, 7 and 8 of the stator. There may be any number of series of contacts 14, as desired. A circuit closing member 15 having a contact or blade 16 is carried by a shaft or rod 17 adapted to be moved axially by a solenoid 18 acting on the core 19 carried by the shaft 17. This solenoid may be so constructed and arranged to move the shaft 17 in either direction as desired. Any suitable means 20, whether springs, brake elements or the like, may be used in connection with the shaft 17 to govern its rate of movement in either direction of the shaft 17 and the contact 16.

The solenoid is energized by the closing of a switch 21 connected to the main line wires 22 and 23 and to the leads 24 and 25 of the solenoid 18. The rotor armature solenoid 13 is constantly energized by the current from the main line by way of conductors 26 and 27 leading to brushes 28 and 29 contacting slip rings 30 and 31 suitably insulatingly carried on the armature shaft and connected by conductors 32 and 33 to the winding of the coil 13.

From the conductor 26 is connected a flexible conductor 34 leading to the contact 16 to establish circuit closing through the circuit closing contacts and the connected circuits to the corresponding stator coils 11 and thence to the conductor 35 connected to the conductor 27.

As for example, when the contact 16 is in contact with the first or No. 1 contact 14 of the first series, the circuit is closed by way of the wires 22, 26, and 34, thence contact 16, No. 1 contact 14, wire 36 to No. 1 stator pole coil 11, thence by wires 37, 35, 27 and 23.

For the remaining contacts 14 of the series, namely No. 2 to No. 8 contacts, the circuits are similarly closed by way of the wires 22, 26, 34, contact 16, contact 14 (No. 2 to No. 8) and respectively by way of the wires 38, 39, 40, 41, 42, 43 and 44 leading to the No. 2 to the No. 8 stator pole coils 11, and thence by wires 37, 35, 27 and 23.

Further movement of the contact 16 brings it in contact with a No. 1 contact 14 at the end of the first series or at the beginning of the second series, so that the circuit may be completed by way of the wire 36ª, wire 36 and coil No. 1 of the stator coils 11. In this way it will be seen that the successive energizing of the stator coils 11 has been through a complete revolution from No. 1 coil, through No. 2 to No. 8 coils and thence to No. 1 coil again. In the figure of the drawing this has been effected clockwise.

The system may be continued for another revolution if desired. As for example, by continuing to move contact 16 to No. 2 commutator contact of the second series, the circuit is closed by way of wires 22, 26 and 34, contact 16, No. 2 second series contact 14, wires 38ª, 38, No. 2 stator coil 11, and wires 37, 35, 27 and 23.

Likewise, the circuits may be closed for the remaining contacts 14 of the second series, namely No. 3 to No. 8 contacts, by way of wires 22, 26 and 34, contact 16, contact 14 (No. 3 to No. 8 of the second series), then respectively wires 39ª, 40ª, 41ª, 42ª, 43ª and 44ª respectively to wires 39, 40, 41, 42, 43 and 44 connected to No. 3 to No. 8 stator pole coils 11, thence by way of wires 37, 35, 27 and 23.

At the end of the second series, is a No. 1 contact connected by wire 36ᵇ by way of wire 36 to No. 1 stator coil 11, this completing the second revolution of energizing the stator coil series.

This system may be carried out to any desired extent by the provision of any number of additional sets or series of circuit closing contacts to effect the desired corresponding number of revolutions of the armature.

In the figure shown on the drawing the No. 1 stator coil is energized and its pole acts to hold the armature pole 12 opposite it. Any tendency to move the armature in either direction will be counteracted by the stress of the No. 1 stator pole acting on the armature pole to hold the latter in position, thus producing a braking torque of like effect. If No. 2 stator coil is also energized, the armature pole 12 would be between the No. 1 and the No. 2 stator poles by reason of both stressing the armature pole 12. Any tendency to move the armature in either direction will be counteracted by the stresses of the No. 1 and the No. 2 stator poles acting on the armature pole 12 to hold the latter in position, thus producing a braking torque or like effect.

The contact 16 is of such a width so that as it is moved along the contacts 14, it will contact the succeeding contact 14 before leaving the preceding contact 14 and hence close the circuit to the succeeding stator coil before opening the circuit of the preceding stator coil of the series. As for example, in the figure of the drawing, when the contact 16 moves toward and to No. 2 commutator contact 14, No. 2 stator coil 11 is energized and hence the armature pole 12 is stressed so that the armature pole is moved into a position between the No. 1 and the No. 2 stator poles, both the latter being energized, the movement from the No. 1 position to the position between No. 1 and No. 2 being effected smoothly and evenly. When the contact 16 has entirely left No. 1 contact 14 and the circuit to No. 1 stator coil thus has been opened the No. 1 stator pole no longer stresses the armature and so the latter moves smoothly from its intermediate position between No. 1 and No. 2 stator poles to a position opposite No. 2 stator pole.

Continued operation in similar fashion is effected as the contact 16 continues to travel along the contacts 14. When it arrives at No. 1 contact at the end of the first series, the armature, and hence the rotor, has made a complete revolution. When the contact 16 reaches the No. 1 contact at the end of the second series of contacts 14, the armature has made two complete revolutions. With further series of contacts further rotations of the armature is possible and it is to be understood the invention is not limited in this respect but comprehends the idea of using as many series of circuit closing contacts as the number of revolutions it is desired the armature should make for the purpose of its use.

Upon moving the contact 16 successively over the circuit closing contacts in reversed order or direction, the stator coils become successively energized also in reverse order or direction of the series, as for example, from No. 1 to No. 8, thence to No. 7 and so on down the series until it reaches No. 1 again, the armature rotating in the opposite direction (anti-clockwise as viewed in the figure or the drawing for a complete revolution, and as the contact 16 continues its reverse movement over the next series of contacts the stator poles are again similarly energized and the armature rotated as before.

Irrespective of the direction of rotation of the armature and the rotor carried by it, it will be noted that the energizing of the coils is always effected in the same way, that is, with the same direction of current flow. There is no reversal of the current in any place whatsoever in the motor.

While I have herein described and upon the drawing shown an illustrative embodiment of the invention, it is to be understood that the invention is not limited thereto but comprehends other constructions, arrangements of parts, details, features and the like without departing from the spirit of the invention.

Having thus disclosed the invention, I claim:

1. An electric motor for producing high torque at low speed comprising a stator having a series of field poles and energizing coils so wound as to all have the same polarity and a given polarity when said coils are energized through a given circuit independent of the armature circuit, a rotor having an armature pole and an energizing coil so wound as to have a polarity opposite to the polarity of the field poles when the armature pole coil is energized, said armature coil having a separate circuit independent of the circuit for said field coils, and a circuit control means for the circuits of said stator coils comprising a series of circuit closing contacts and circuits so arranged and connected as to correspond with the field pole coils, and a circuit closing means so constructed and arranged as to successively contact the contacts for successively energizing the field pole coils of the stator in either direction of the series of the field poles and for regularly moving the armature with a high torque at low speed serially of the field poles in accordance with the energizing thereof.

2. An electric motor for producing high torque at low speed comprising relatively movable members of which a member comprises a pole and an energizing coil so wound as to have a given polarity when said coil is energized, said pole coil being energized through a circuit connected with a specific source of electric supply, another member having a series of poles and energizing coils so wound as to all have the same and a given polarity when said coils are energized, such polarity being opposite to the polarity of the pole of the first mentioned member when energized, said latter pole coils having a separate and independent circuit from the coil circuit of said other member and being energized from said separate and independent circuit, said coil circuit of said first mentioned member maintaining said coil constantly energized during the operation of the motor and making possible the simultaneous supplying to the coil of said first mentioned member of a different electric current from the current supplied to the coils of said other member for producing high torque at low speed and likewise providing torque braking, and circuit control means comprising a series of circuit closing contacts and circuits so arranged and connected as to correspond with the pole coils of said other member, and a circuit closing means so constructed and arranged as to successively contact the contacts for successively energizing the pole coils of said other member in either direction of the series thereof and for regularly moving the relatively movable member with torque serially of the poles of said other member in accordance with the energizing thereof.

3. A machine for doing work at low speed and high torque, comprising relatively movable members of which a member comprises a series of electrically energizable elements all having the same polarity when energized, another member having an electrically energizable element so arranged as to have a polarity when energized opposite to the polarity of the first mentioned elements when energized, said element being so constructed and arranged as to have a continuous supply of electric current independent of the supply of current in the said other elements, a circuit control means comprising a series of circuit closing contacts and circuits so arranged and connected as to correspond with the said other elements, and a circuit closing means so constructed and arranged as to successively contact said contacts for successively energizing the said other elements in either direction of the series thereof and for effecting relative and regular movement of said members with torque serially of the said other elements in accordance with the energizing thereof.

4. A machine for doing work at low speed and high torque, comprising relatively movable members of which one of the members comprises an electrically energizable element having a given polarity when energized, and of which another of said members comprises a series of electrically energizable elements so arranged as to have a polarity when energized opposite to the polarity of the first mentioned element when energized, said latter element being so connected as to have a continuous supply of electric current independent of and separate from the supply of current in the aforesaid elements, a circuit control means comprising a series of circuit closing contacts and circuits so arranged and connected as to correspond with the aforesaid elements, and a circuit closing means so constructed and arranged as to successively contact said contacts for successively energizing the aforesaid elements in either direction of the series thereof and for effecting relative and regular movement of said members with torque serially of the aforesaid elements in accordance with the energizing thereof.

EUGENE S. TAYLOR.